Sept. 13, 1927.
J. SHEBOL ET AL
PISTON PRESSURE GAUGE
Filed Jan. 22, 1925
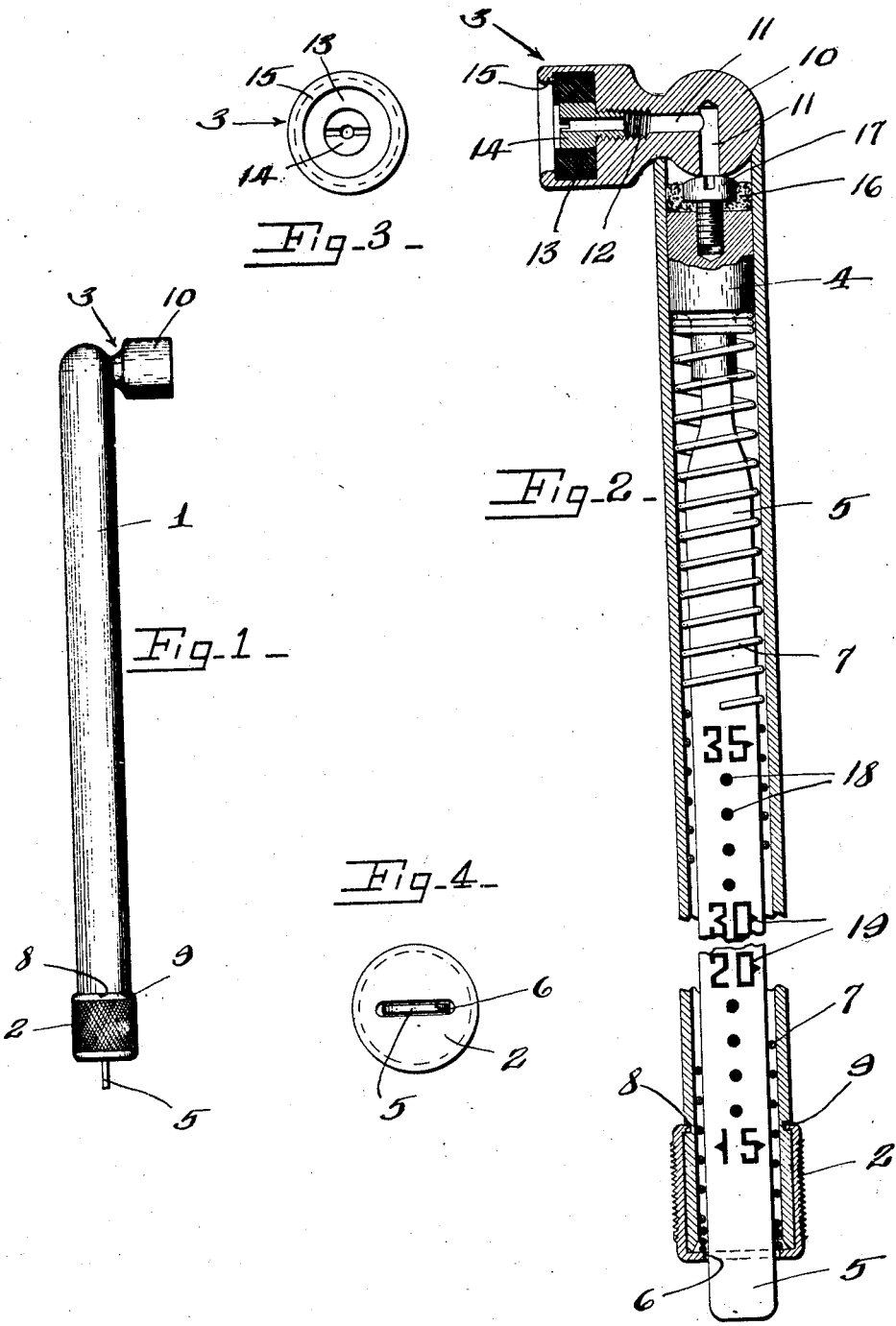
Joseph Shebol and William F. Albrecht
INVENTORS.
BY
Parsons & Bordell
ATTORNEYS.

Patented Sept. 13, 1927.

1,642,563

UNITED STATES PATENT OFFICE.

JOSEPH SHEBOL AND WILLIAM F. ALBRECHT, OF SYRACUSE, NEW YORK; SAID SHEBOL ASSIGNOR TO SAID ALBRECHT.

PISTON PRESSURE GAUGE.

Application filed January 22, 1925. Serial No. 4,090.

This invention relates to pressure gauges and particular gauges for use in determining the amount of pressure in pneumatic tires which gauge is particularly simple and economical in construction and highly efficient and durable and accurate in use.

The invention consists in the novel features and in the combinations and constructions hereinafter set forth and claimed.

In describing this invention, reference is had to the accompanying drawings in which like characters designate corresponding parts in all of the views.

Figure 1 is an elevation of this pressure gauge.

Figure 2 is an enlarged central longitudinal sectional view through the air gauge.

Figure 3 is the end view of the air chuck.

Figure 4 is an end view looking forwardly in Figure 1.

This gauge comprises, generally, a tubular body having a cap at one end formed with a slot and an air chuck having an inlet for air at the other end of the body, a piston movable in the body and having an indicator in the form of a blade extending through the slot in the cap, the blade having calibrations and indications on its flat faces, and means for resisting the movement of the piston, the cap being rotatable about the body to turn the blade in such position that its flat faces are in reading position, that is, are in position to be easily read by the observer.

1 designates the tubular body.

2 is the cap at the outer end of the body, which cap is rotatable about the body and interlocked therewith against endwise movement.

3 designates generally the air chuck at the other end of the body.

4 is the piston movable in the body 1.

5 is the indicator in the form of a blade movable with the piston, the indicator extending through a slot 6 in the cap.

7 is the spring located in the body 1 and encircling the indicating member and thrusting at one end against the piston and at its other end against the cap.

The cap 2 as here shown is provided with a sleeve portion enclosing the end of the tubular body 1 and having an inturned flange 8 which interlocks in an annular groove in the body, the cap being rotatable about the body but held from endwise displacement.

The air chuck 3 is combined with a head 10 at the end of the tubular body 1, the head 9 being here shown as spherical in form and as set into the end of the tubular body 1 and secured thereto as by soldering or welding. The head is formed with an inlet passage 11. The chuck 3 is in the form of a cup shaped body having a passage 12 communicating with the passage 11 and opening through the bottom of the cup. A suitable packing or seal as a relatively thick rubber washer 13 is fitted in the cup shaped body against the bottom thereof, and a valve opening plug 14 is located within the washer 13 and has a stem threading into the passage 12. The rubber washer 13 is held in position by the turned over outer edge 15 of the body of the chuck. The valve opening plug 14 is however held in position by its stem threading into the passage 12. Neither the washer 13 is held in position by the plug 14, nor the plug 14 by the washer.

The piston 4 is provided with a packing washer 16 on its pressure face and the piston is provided with means as a screw 17 having its head arranged in advance of the washer 16 for engaging the heads and thus preventing the packing 16 from coming in contact with the head, so that crushing and distortion of the packing is avoided.

The indicator blade is provided with suitable graduations 18 and indications as numerals 19 at intervals, these being located on the flat faces of the blade.

In operation, the air chuck is pressed upon the end of the valve stem of a tire, the stem of the check valve in the valve stem of the tires projecting at the end of the tire valve stem engaging the valve opener 14 and the end of the valve stem of the tire embedding into the rubber washer or seal 13. When the check valve of the tire is thus open, the pressure through the passages 12 and 11 into the body 1 moves the piston 4 outwardly against the action of the spring 7 and the reading visible on the blade 5 in line with the outer face of the cap indicates the number of pounds pressure there is in the tire.

In order to bring the indicator into reading position, the cap 2 is turned, thus turning the indicator 5 to bring the flat faces thereof into reading position.

What we claim is:

1. A pressure gauge comprising a tubular body having a cap at its outer end formed with a slot and an inlet at its inner end, a piston movable in the body and an indicator in the form of a flat blade movable with the piston and projecting therefrom and through the slot and having graduations on one of its faces, the cap having a sleeve portion inclosing the end of the body and such sleeve portion having an inturned flange at its inner end and the body being formed with an annular groove for receiving the flange whereby the cap is rotatable about the body to bring the flat faces of the indicator blade into reading position and a spring located in the body between the piston and the head of the cap.

2. A gauge comprising a tubular body having a combined head and air chuck at one end, the head having a spherical portion extending into the end of the tubular body and bearing against the circular edge of the tubular body and secured thereto, the head having a passage therethrough.

3. A pressure gauge comprising a tubular body having a cap at its outer end formed with a slot and an inlet at its inner end, a piston movable in the body and an indicator in the form of a flat plate movable with the piston and projecting therefrom, and through the slot, the plate having graduations on one of its faces, the cap having a sleeve portion enclosing the end of the body and interlocked with the body to prevent axial displacement of the cap, the sleeve of the cap being rotatable about the body to bring the flat face of the blade into reading position.

In testimony whereof, we have hereunto signed our names, at Syracuse, in the county of Onondaga, and State of New York, this 18th day of December, 1924.

JOSEPH SHEBOL.
WILLIAM F. ALBRECHT.